US 9,239,065 B2

(12) United States Patent
Zaleski et al.

(10) Patent No.: US 9,239,065 B2
(45) Date of Patent: Jan. 19, 2016

(54) HYDRAULIC SOFT START SYSTEM

(71) Applicants: Edmund Joseph Zaleski, Dalton, OH (US); Paul D. Ellsworth, Richfield, OH (US)

(72) Inventors: Edmund Joseph Zaleski, Dalton, OH (US); Paul D. Ellsworth, Richfield, OH (US)

(73) Assignee: Maradyne Corporation, Cleveland, OH (US)

( * ) Notice: Subject to any disclaimer, the term of this patent is extended or adjusted under 35 U.S.C. 154(b) by 276 days.

(21) Appl. No.: 14/058,825

(22) Filed: Oct. 21, 2013

(65) Prior Publication Data

US 2014/0041373 A1  Feb. 13, 2014

Related U.S. Application Data

(63) Continuation-in-part of application No. 12/841,705, filed on Jul. 22, 2010, now Pat. No. 8,578,713.

(51) Int. Cl.
| | |
|---|---|
| *F15B 15/00* | (2006.01) |
| *F15B 21/10* | (2006.01) |
| *F15B 1/027* | (2006.01) |
| *F02N 9/04* | (2006.01) |
| *B60K 6/12* | (2006.01) |

(52) U.S. Cl.
CPC . *F15B 15/00* (2013.01); *F02N 9/04* (2013.01); *F15B 1/027* (2013.01); *F15B 21/10* (2013.01); *B60K 2006/126* (2013.01); *F15B 2211/212* (2013.01); *F15B 2211/25* (2013.01); *F15B 2211/324* (2013.01); *F15B 2211/40507* (2013.01); *F15B 2211/50518* (2013.01); *F15B 2211/7058* (2013.01); *F15B 2211/851* (2013.01)

(58) Field of Classification Search
CPC ... F15B 21/10; F15B 1/027; B60K 2006/126; F02N 9/04
USPC .............. 60/459, 468, 626, 627; 91/445, 446, 91/447, 448; 123/179.31
See application file for complete search history.

(56) References Cited

U.S. PATENT DOCUMENTS

| | | | | |
|---|---|---|---|---|
| 3,384,027 | A | * | 5/1968 | Jennings ................. F01B 3/106 123/179.31 |
| 3,722,209 | A | * | 3/1973 | Kaytor .................. F01M 5/025 123/179.31 |
| 3,811,281 | A | | 5/1974 | Wise et al. |
| 4,077,746 | A | | 3/1978 | Reynolds |
| 4,487,173 | A | | 12/1984 | Maucher et al. |
| 4,494,499 | A | | 1/1985 | Stein |
| 4,653,527 | A | | 3/1987 | Kosarzecki |

(Continued)

OTHER PUBLICATIONS

Website Page—www.kocsistech.com/page_accessories.html dated May 5, 2009.

*Primary Examiner* — Thomas E Lazo
(74) *Attorney, Agent, or Firm* — Fay Sharpe LLP

(57) ABSTRACT

A hydraulic soft-start system includes a first flow restricting orifice and a flow control valve both being in fluid communication with a pressure source and an inlet of a motor. Also provided is a second flow restricting orifice disposed between a pilot for actuating the flow control valve and the inlet of the motor. A first flow is passed from the pressure source via the first orifice to an inlet of the motor, placing the motor in a partially-actuated state. The flow control valve is actuated after a threshold pressure of the pilot is reached allowing a second flow to pass from the pressure source to the motor inlet. The second flow is higher than the first flow, thereby placing the motor in a fully-actuated state.

12 Claims, 6 Drawing Sheets

(56) References Cited

U.S. PATENT DOCUMENTS

| | | |
|---|---|---|
| 4,694,791 A | 9/1987 | Tanaka |
| 4,747,270 A * | 5/1988 | Klie .................... F02N 7/08 |
| | | 123/179.31 |
| 4,960,085 A | 10/1990 | Coons |
| 5,050,636 A | 9/1991 | Sagawa et al. |
| 5,255,644 A | 10/1993 | Mills et al. |
| 5,267,539 A | 12/1993 | Becker et al. |
| 5,337,713 A | 8/1994 | Mills |
| 5,381,823 A | 1/1995 | DiBartolo |
| 5,381,828 A * | 1/1995 | Kimura ............... F15B 11/068 |
| | | 137/596 |
| 5,542,384 A * | 8/1996 | Rosenmann ........ F16K 31/383 |
| | | 123/179.31 |
| 5,977,730 A | 11/1999 | Clutter et al. |
| 6,026,695 A | 2/2000 | Bartlett et al. |
| 6,079,957 A | 6/2000 | Jirele |
| 6,615,786 B2 * | 9/2003 | Mori .................... F02N 7/00 |
| | | 123/179.31 |
| 6,718,763 B2 * | 4/2004 | Maruta .............. F15B 11/0423 |
| | | 60/456 |
| 6,736,099 B2 * | 5/2004 | Mori .................... F02N 7/08 |
| | | 123/179.31 |
| 6,968,684 B1 | 11/2005 | Hauser et al. |
| 7,467,642 B2 | 12/2008 | Prinsen et al. |
| 7,766,105 B2 * | 8/2010 | Albright ................ A01C 3/06 |
| | | 180/53.61 |
| 7,891,375 B2 * | 2/2011 | Decker ............... F15B 11/0406 |
| | | 137/596.1 |
| 2006/0214035 A1 | 9/2006 | Albright et al. |

* cited by examiner

HYDRAULIC SOFT START SYSTEM

CLAIM OF PRIORITY

This application is a continuation-in-part of application Ser. No. 12/841,705, filed on Jul. 22, 2010 and still pending, the entirety of which is hereby incorporated by reference.

BACKGROUND

The present application generally relates to the field of hydraulic power systems. In particular, the present application pertains to equipment capable of gradually engaging and/or driving a hydraulic motor (e.g., soft start systems).

In general, prior art hydraulic starting systems for starting a hydraulic motor involved the use of a primary flow control valve that slowly or partially opened to regulate the initial pressure and/or fluid flow to a hydraulic motor to be driven.

One problem associated with such prior art "soft start" systems is that they are not efficient in the use of the hydraulic fluid. For example, as the primary control valve is slowly opened, the pressure and flow is generally proportionally increased until the pressure and flow supplied to the hydraulic motor to be driven is adequate to begin to drive the motor and any load that may be applied to the motor. From the time of initial engagement of any and all intermediate transmission components and the actual rotation of the motor, any fluid pressure and flow that is bypassed or leaking through the system components is not producing any work. Thus, this lost fluid pressure and flow is directly attributable to the inefficiencies of such prior art systems.

This can be a particular concern in systems with a limited pressure reserve for powering a hydraulic motor for a limited period of time (e.g., a hydraulic accumulator based pressure source for starting an engine, etc.). As the primary flow valve (s) is/are throttled from a closed position to an open position, fluid pressure and flow are lost in the time it takes the flow and pressure to achieve a level necessary to engage and/or rotate the hydraulic motor (e.g., for purposes of starting an engine). As such, the fluid is less efficiently used during the time it takes the valve to go from fully closed to fully open, ultimately resulting in less work being performed by the motor (e.g., less cranking cycles available for hydraulically starting an engine).

Another problem which exists in these prior art systems, is that the various valves (e.g., relief valves, control valves, etc.) and/or other charging components are separated such that numerous individual connections must be made between these components using additional hydraulic lines and connectors. This increases not only the cost of such a system, but also the failure rate of the system, the potential for leaks, and the introduction of contaminants, etc.

Yet another problem which exists in the prior art, is that temperature fluctuations often create performance variations in the ability of the system to properly engage and/or start a hydraulic motor to be driven. As such, consistent and effective operation of such systems can be problematic when the system is subjected to fluctuating ambient conditions.

For at least these reasons, a need exists to provide an improved hydraulic soft start system which overcomes the aforementioned problems and others.

SUMMARY

According to one aspect of the present disclosure, a hydraulic soft start system for actuating an associated hydraulic motor is provided. A hydraulic pressure source and a first flow control valve are provided. The first flow control valve includes an inlet and an outlet. The inlet of the first flow control valve is in fluid communication with the hydraulic pressure source. The outlet of the first valve is in fluid communication with a high pressure inlet of the associated hydraulic motor. A first flow restricting orifice is provided in fluid communication with and disposed between the outlet of the first valve and the inlet of the associated hydraulic motor. A second flow control valve is provided including an inlet and an outlet, the inlet of the second valve being in fluid communication with the outlet of the first valve. The outlet of the second valve is in fluid communication with the inlet of the associated hydraulic motor. A hydraulic pilot for actuating the second flow control valve is provided. The pilot is in fluid communication with the inlet of the associated hydraulic motor. A second flow restricting orifice is provided in fluid communication with and disposed between the pilot and the inlet of the associated hydraulic motor. Upon actuation of the first valve, a first fluid flow is passed from the hydraulic pressure source via the first orifice to the inlet of the associated motor. The first fluid flow places the associated motor in a partially-actuated low power state. A portion of the first fluid flow is passed via the second orifice to the pilot. The second valve is actuated after a threshold pressure of the pilot is reached allowing a second fluid flow to pass from the pressure source to the inlet of the associated motor. The second fluid flow is higher than the first fluid flow, thereby placing the associated motor in a fully-actuated high power state.

A unitary hydraulic soft start system for use in starting a hydraulic motor includes a housing and a pressure source port defined in the housing for receiving pressurized hydraulic fluid from an associated hydraulic pressure source and a hydraulic motor located in the housing to which the hydraulic pressure source supplies fluid to start the hydraulic motor. A drain port is defined in the housing in a downstream position from the hydraulic motor. A pilot operated flow control valve located in the housing includes a pilot, an inlet, and an outlet. The inlet is in fluid communication with the pressure source port and the outlet is in fluid communication with the hydraulic motor. A first flow restricting orifice is located in the housing in fluid communication with and disposed between the pressure source port and the hydraulic motor. A second flow restricting orifice is located in the housing in fluid communication with and disposed between the pilot and the hydraulic motor. When pressurized hydraulic fluid is supplied to the pressure source port, a first fluid flow is passed from the pressure source port via the first orifice to the hydraulic motor placing the hydraulic motor in a first partially actuated low power state. A portion of the first fluid flow is passed via the second orifice to the pilot placing the valve in an open state after an actuation pressure is reached and allowing a second fluid flow to pass from the pressure source port to the hydraulic motor. The second fluid flow is higher than the first fluid flow thereby placing the hydraulic motor in a second fully actuated high power state subsequent to the first partially actuated low power state.

According to another embodiment of the present disclosure, a method is provided for soft starting a hydraulic motor. The method comprises providing a hydraulic pressure source for supplying a pressurized hydraulic fluid and providing a first flow restricting orifice including an inlet and an outlet with the inlet being in communication with the pressure source. A second flow restricting orifice is provided including an inlet and an outlet with the inlet being in fluid communication with the outlet of the first flow restricting orifice. A hydraulic motor is provided including an inlet communicating with the outlet of the first flow restricting orifice and an outlet in communication with a drain port. A piloted flow control valve is provided including an inlet in fluid communication with the pressure source and an outlet in fluid communication with the hydraulic motor wherein the pilot is in fluid communication with the outlet of the second flow restricting orifice. The fluid from the pressure source is allowed to flow through the first flow restricting orifice to the inlet of the hydraulic motor at a reduced flow rate, the motor thereby being placed in a partially powered first state. A portion of the fluid flowing through the first orifice is allowed to flow through the inlet of the second flow restricting orifice, the second orifice being in fluid communication with the pilot of the flow control valve. The flow control valve is actuated when the fluid pressure at the pilot reaches a valve actuating pressure. Fluid is then allowed to flow through the flow control valve to the hydraulic motor at an increased flow rate when the flow control valve is actuated, the motor thereby being placed in a fully powered second state.

BRIEF DESCRIPTION OF THE DRAWINGS

The present disclosure may take form in various components and arrangements of components and various steps and arrangement of steps. The drawings are only for purposes of illustrating various embodiments of the present disclosure and are not to be construed as limiting the disclosure.

DETAILED DESCRIPTION

Figure 1:
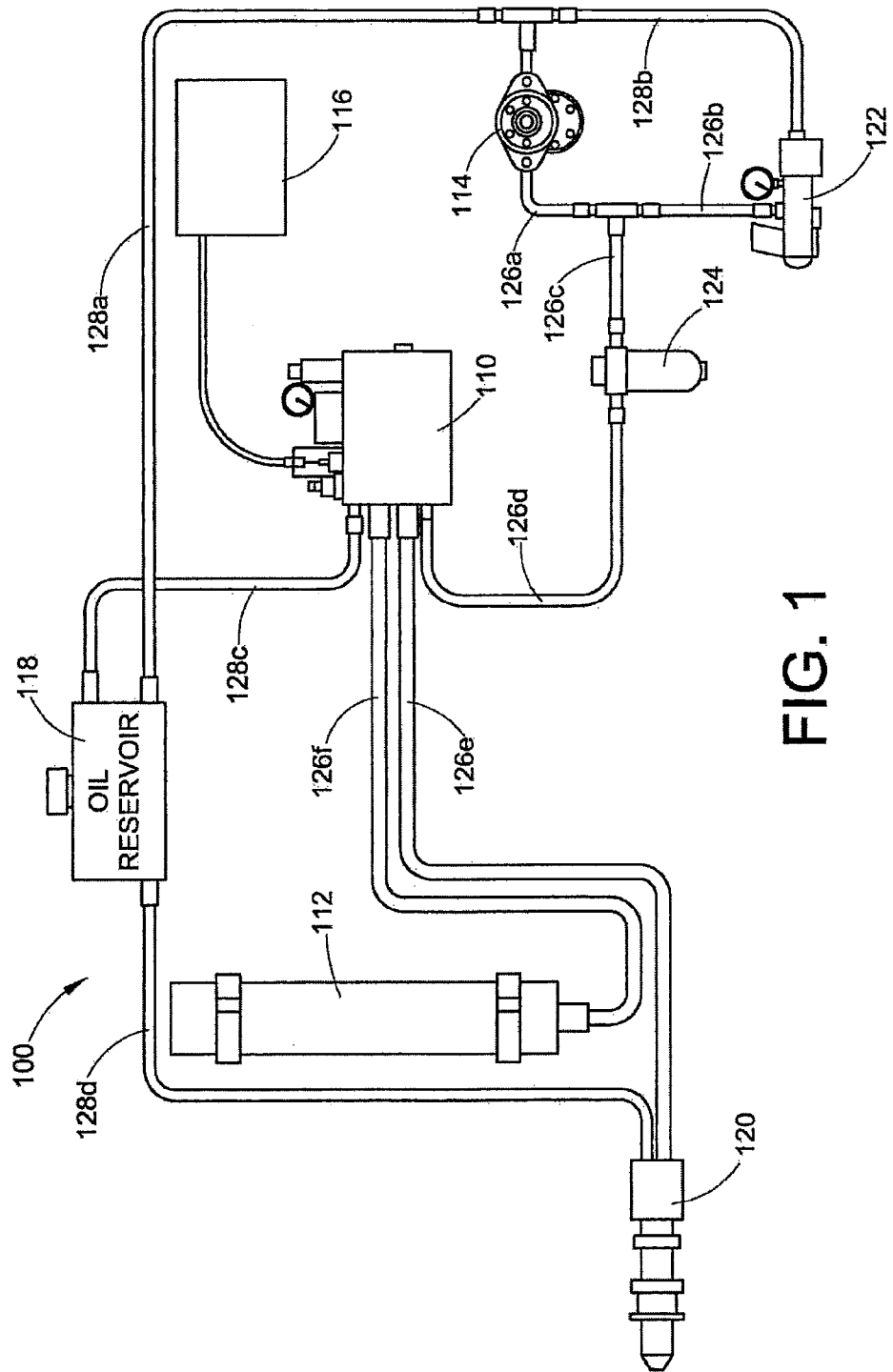
FIG. 1 is a schematic illustration of a first embodiment of a hydraulic soft start system, according to the present disclosure.

With reference to FIG. 1, a first embodiment of a hydraulic soft start system 100 is there illustrated. By way of example only, the system 100 will be described with reference to an engine starting circuit for starting an internal combustion engine. As illustrated in FIG. 1, the system 100 may include a soft start manifold assembly 110, a hydraulic pressure source (e.g., an accumulator 112 or other hydraulic pressure and flow generating device), a hydraulic pump 114 for charging or pressurizing the accumulator 112, a control panel 116 for remotely controlling the soft start manifold assembly 110 or the system 100, an oil reservoir 118, and an associated hydraulic motor to be driven 120. The hydraulic motor can, in turn, be used to start an internal combustion engine (not shown), if so desired. However, it should be noted that the system 100 or slight variations of the system 100 could be used to drive other mechanical and/or transmission related equipment (e.g., construction and farming equipment, transportation systems, amusement rides, elevators, lifts, and/or various other commercial and/or residential applications, etc.).

In addition, the system 100 may include a manual hand pump 122 for charging the pressure source or accumulator 112 (e.g., under conditions when the hydraulic pump 114 is not available to pressurize the accumulator 112). Also, a high pressure filter 124 may be provided for filtering out foreign particles from the working fluid. In the system 100 where both the manual hand pump 122 and the hydraulic pump 114 are included (as illustrated in FIG. 1), a shuttle valve 125 can be disposed between the outlets of the respective pumps 114, 122 to prevent pressurized fluid, discharged by the active pump, from back-flowing through the inactive pump (which would effectively bypass the rest of the system 100). As such, the shuttle valve 125 (being pressure activated) directs the pressurized fluid from the output of the active or pump-in-use to high pressure filter 124. Furthermore, a series of high pressure hydraulic fluid lines 126A-126F and a series of low pressure hydraulic fluid lines 128A-128D are used to connect the various system components in the manner illustrated, by way of example only, in FIG. 1.

In general, low pressure fluid is drawn from the oil reservoir 118 by either the pump 114 (which may be engine driven) or the manual hand pump 122. With continued reference to FIG. 1, pressurized fluid then exits the driven pump 114 or hand pump 122 and proceeds through the shuttle valve 125 and the high pressure filter 124 to the soft start manifold assembly 110. Depending on the various conditions of the system and the operating state of the manifold assembly 110, fluid is either provided to the hydraulic pressure source or accumulator 112, to the hydraulic motor to be driven 120 and/or returned to the oil reservoir 118. Similarly, depending on the state of the operation of the system, the accumulator 112 is either being charged with hydraulic fluid, being maintained at certain pressure level, or being discharged through or by the manifold assembly 110. Once charged, the fluid from the accumulator 112 can be eventually passed through manifold assembly 110 to the hydraulic motor 120 and returned to the oil reservoir 118. The operation of the system 100, and particularly the arrangement and operation of the manifold assembly 110, are discussed in greater detail below.

Figure 2:
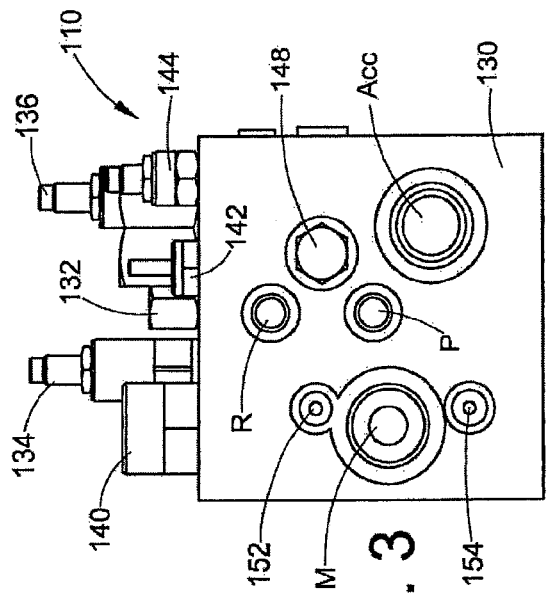
FIG. 2 is a front side view of a first embodiment of a hydraulic soft start assembly, of the system of FIG. 1.
Figure 3:
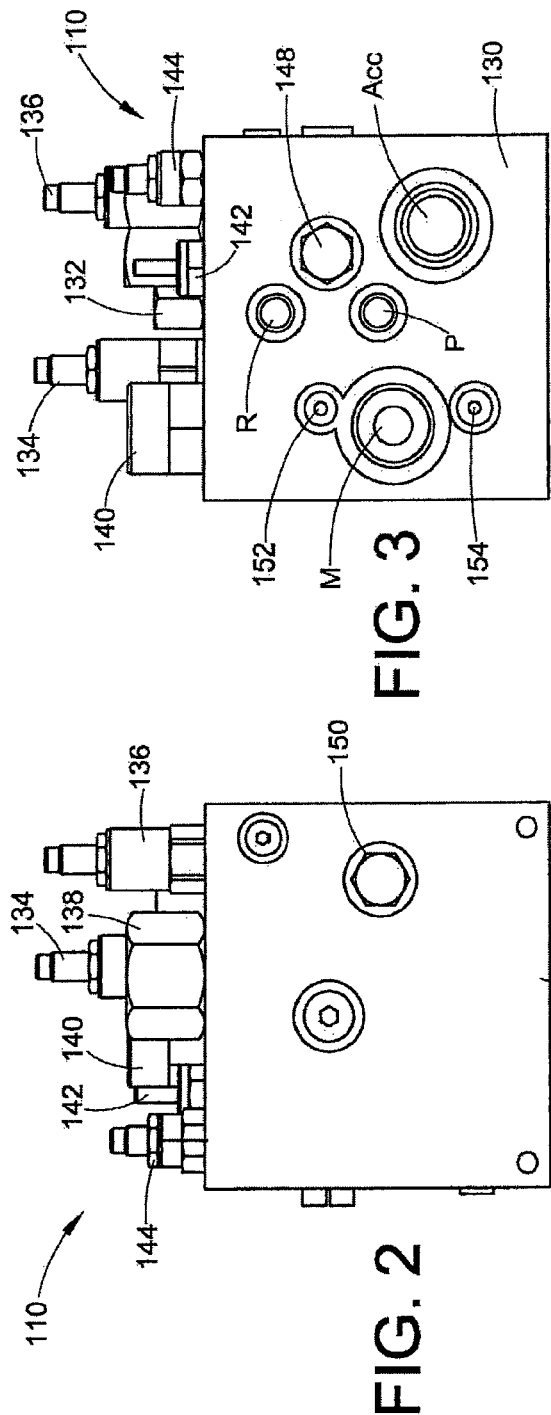
FIG. 3 is a left side view of the hydraulic soft start assembly of FIG. 2, illustrating the location of a plurality of hydraulic ports and orifices.
Figure 4:
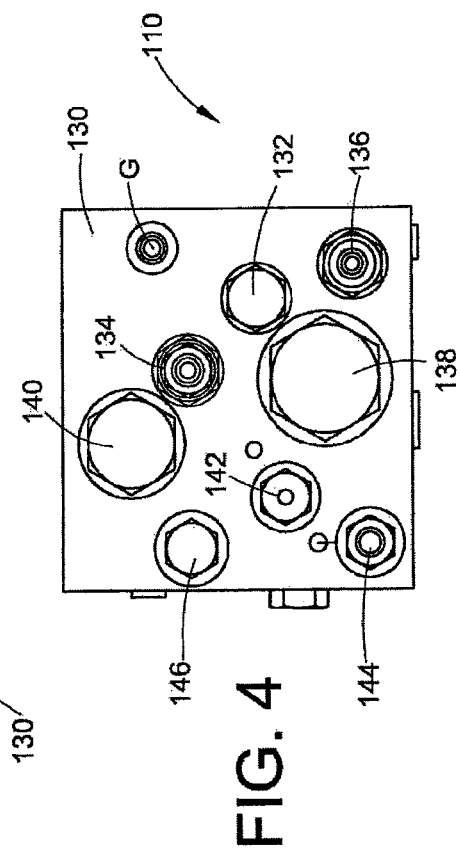
FIG. 4 is a top plan view of the hydraulic soft start valve assembly of FIG. 2, illustrating a plurality of cartridge style hydraulic valves.

With reference now to FIGS. 2-4, a front, left, and top side view of the manifold assembly 110 is illustrated, respectively. As shown in FIGS. 2-4, the manifold assembly 110 generally includes a manifold or other valve body housing 130 that can be fabricated from any material having the appropriate strength and fatigue properties for withstanding the operating pressures used by the hydraulic soft start system. While a system capable of operating under extreme pressures could be designed, it would be generally adequate and cost effective for most systems to be designed for a maximum operating pressure of between 3000-4000 psi.

With continued reference to FIGS. 2-4, disposed either internally to or partially within the manifold or housing 130 are a plurality of valves, orifices and/or plugs. In particular, the soft start manifold assembly 110 may include an unloading valve 132 (which may be a vented spool logic valve), a pressure sensing valve 134 (or adjustable unloading pilot valve), a relief valve 136 (which may be an adjustable direct acting poppet relief valve), a first flow control valve 138 (which can be a spring biased vented poppet type logic valve), and a second flow control valve 140 (which can be a piloted two way spool valve). In addition, the manifold assembly 110 may include a manually operated pull valve 142 (which may be a manual pull-to-open spring return valve), a system bypass valve 144 (which may be an adjustable needle valve), a first check valve 146, a second check valve 148 and a third check valve 150. Furthermore, the manifold assembly 110 may include a first flow restricting orifice 152, a second flow restricting orifice 154, and a variety of fluid connection ports including a gauge port G, an accumulator or pressure source port ACC, a reservoir port R, a pump port P and a high pressure supply port for the hydraulic motor M. The arrangement, operation, and interconnections of the aforementioned manifold components are discussed in greater detail below with reference to FIG. 5.

Figure 5:
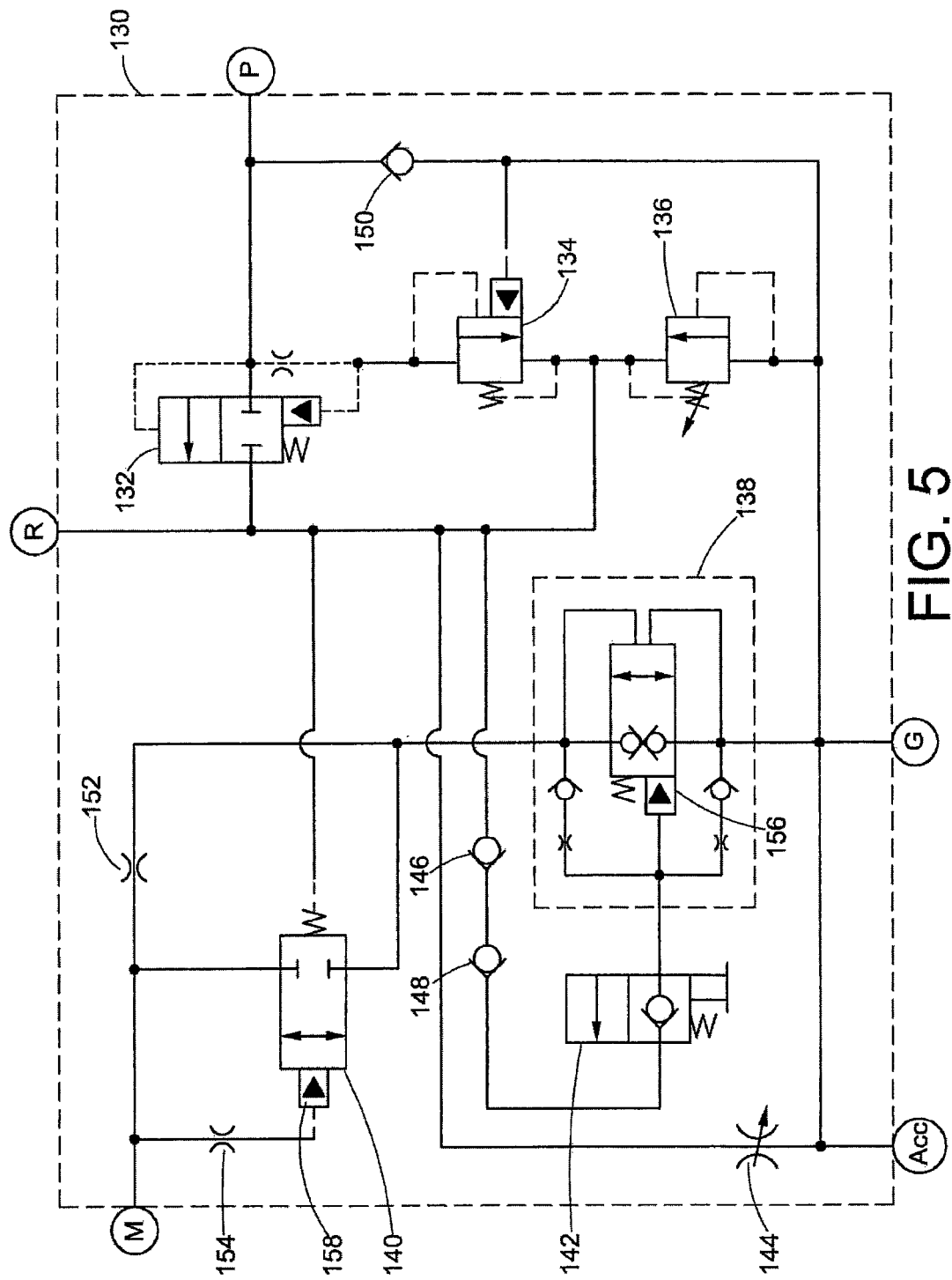
FIG. 5 is a hydraulic schematic of the hydraulic soft start assembly of FIG. 2.

Now with particular reference to FIG. 5, a schematic diagram of the manifold assembly 110 is provided which illustrates the internal connections between the various components that are disposed either partially or entirely within the manifold assembly. The components of the manifold assembly can be generally divided into three categories: 1) driving components for engaging/driving the hydraulic motor; 2) charging components for charging the pressure source (i.e., the accumulator); and 3) safety/bypass components. The driving components may include the first flow control valve 138, the second flow control valve 140, the manual pull valve 142, first and second check valves 146,148, and first and second flow restricting orifices 152, 154. As will be discussed below, the driving components cooperate to pass fluid from the accumulator port ACC to the motor port M of the manifold assembly to engage/drive the hydraulic motor of the system. The charging components of the manifold assembly may include the unloading valve 132, pressure sensing valve 134, and the third check valve 150. Here, the charging components cooperate to pass fluid from the pump port P to the accumulator port ACC to charge the accumulator with hydraulic fluid to a set or particular charge pressure. Finally, the safety/bypass components of the manifold assembly may include the relief valve 136 (for protecting the manifold assembly and other system components from being damaged due to over-pressurization) and the bypass valve 144 (for allowing bypass of any flow from the pump as well as any fluid pressure and flow from the accumulator to the reservoir port R).

Now with reference also to FIGS. 1-5, the general sequence of operation for the manifold assembly 110 will be described with reference to the schematic diagram provided in FIG. 5. In general, the operation of the manifold assembly 110 involves 1) charging the system for use (i.e., unloading, relief and bypass circuitry operation) and 2) actuation/engagement/driving of the hydraulic motor or starter motor (i.e., the soft start valve system circuit operation).

With regard to charging the system for use, hydraulic fluid pressure (from the pump 114) is applied to the port P of the manifold assembly 110. This hydraulic fluid passes through the third check valve 150 to the accumulator port ACC where it is then stored in the accumulator 112. A pressure gauge may also be connected to port G to indicate the charge pressure of the accumulator 112. This same fluid pressure is also applied to the unloading valve 132 (which may be a vented spool logic valve), the pressure sensing valve 134 (which may be an adjustable unloading pilot valve), the relief valve 136 (which may be a direct acting poppet relief valve), the first control valve or "starter" control flow valve 138 (which may be a spring biased poppet valve), and the system bypass valve 144 (which may be an adjustable needle valve).

With continued reference to FIGS. 1-5, when pressure reaches an unloading set point of the pressure sensing valve 134, the pressure sensing valve shifts to vent a bias chamber in the unloading valve 132. This action creates a pressure differential across the unloading valve and when the force created by the pressure differential exceeds a bias spring force of the unloading valve, the unloading valve shifts open. When the unloading valve 132 shifts open, hydraulic pressure from the pump port P is redirected through the unloading valve 132 to the reservoir port R and back to the "supply tank" or reservoir 118. At this point, the pressure differential across the third check valve 150 causes the third check valve 150 to seat preventing any loss of pressure stored in the accumulator 112 connected to the accumulator port ACC.

It should be noted that, in the event the unloading valve 132 fails to shift when the pressure sensing valve 134 shifts or if the pressure sensing valve 134 fails to shift at its proper set point, then relief valve 136 will shift at its preset pressure (for example, at 3300 psi) and relieve excess system pressure through the reservoir port R and back to the reservoir 118. Fluid will continue to flow through the relief valve 136 until pressure drops below the reset pressure point of the relief valve 136, at which time the relief valve 136 will reseat and the system will again begin to build pressure until either the pressure sensing valve 134 and the unloading valve 132 shift properly or until relief valve 136 once again opens providing over-pressure protection for the system.

A "stand-by" or "bypass" mode is reached when the unloading valve 132 has shifted and is bypassing flow to the reservoir port R. At this point, the system should be fully charged and ready to actuate the starter or hydraulic motor 120. As noted previously, the bypass valve 144 is used to vent the system and to relieve pressure when needed from the accumulator 112 to the reservoir 118. It is thus typically left in a "normally closed" state.

Now, with continued reference to FIGS. 1-5, the operation of the manifold assembly 110 (i.e., a "start" or "driving" cycle) with regard to actuating, engaging, and/or driving the starter or hydraulic motor 120 will be discussed. The start or driving cycle can be initiated at any time but to maximize the effectiveness, as for example in starting an engine, it is best to let the system reach the "stand-by" mode prior to initiating the cycle. By way of example, the start cycle can be initiated by pulling the manual pull valve 142 (which may be a pull to open, spring return valve). Opening the manual pull valve 142 creates a vent path from a pilot 156 and/or spring chamber in the first control valve 138 through the manual pull valve 142 and the first and second check valves 146,148 to the reservoir port R and back to the reservoir. Venting the first control valve 138 creates a pressure differential across the spring chamber, which eventually overcomes the spring bias force allowing the first control valve to shift open. It should be noted that, any number of methods or combinations could be used to activate or open the first control valve or any of the flow control devices discussed herein (e.g., electrically actuated via solenoid, hydraulically by pilot pressure differential, or manually, etc.).

As the first control valve 138 shifts open, pressurized hydraulic fluid is allowed to flow from the accumulator port ACC to the "main" or second flow control valve 140 (which may be a piloted two-way spool valve) and through the first flow restricting orifice 152. At this stage, a first fluid flow (being of relatively low flow/pressure) passes through the first orifice 152 to the starter or hydraulic motor 120 (via the motor port M) and eventually through the "timing" or second flow restricting orifice 154. As this first lower fluid pressure and flow are applied to the motor 120, the motor starts to rotate gradually engaging the load or other transmission components to be driven. With reference to the present example of the engine soft start system, the starter motor rotates causing a starter drive mechanism of the starter motor to move forward until it contacts a flywheel of the engine. Once the starter engages the flywheel its free movement is obstructed and backpressure builds in the high pressure hydraulic line connected to the inlet of the starter motor. This backpressure also naturally occurs at motor port M and the second flow restricting orifice 154. The primary purpose of the second flow restricting orifice 154 is to slow the transmission of the backpressure being induced at motor port M to a pilot 158 or pilot chamber of the second flow control valve 140. By slowing the transmission of this backpressure, the starter motor is given an ample opportunity to properly index, if necessary, in order to fully engage the flywheel. Once the pressure applied to the pilot chamber 158 of the second flow control valve 140 (through second flow restricting orifice 154) is sufficient to overcome a spring bias force of the second flow control valve, the valve shifts open. When the second flow control valve 140 shifts open, it supplies a second fluid flow that is higher than the first fluid flow in terms of one or both of pressure and/or volumetric flow rate to the starter (or other driven hydraulic motor). This second higher fluid flow causes the motor to rapidly reach its full speed and torque capability.

The start or driving cycle is complete when (1) all of the hydraulic pressure from the accumulator 112 (or other pressure source) is discharged and pressure falls below that needed to keep the second control valve 140 open against its spring bias force causing the second control valve 140 to close and stopping the fluid flow to the starter or motor 120 or (2) the manual pull valve 142 is released and its spring force returns the manual pull valve 142 to the closed position, closing off the vent path of the pilot and/or spring bias chamber of the first control valve 138. When the differential pressure in the pilot and/or spring chamber (necessary to maintain the first control valve 138 open) ceases to exist, the first control valve 138 then closes. This removes the pressure necessary to keep the second control valve 140 open, ultimately causing the second control valve 140 to close and stopping flow to the starter.

It should be noted that, at any time, if pressure at the pressure sensing valve 134 drops below the set point of the pressure sensing valve 134, the pressure sensing valve 134 will shift causing the unloading valve 132 to shift back to its closed position to permit the accumulator 112 to charge or build up pressure once again. Also, it should be noted that the control panel 116 of the system can be connected to the manual pull valve 142 via cable or other electrical and/or mechanical connection so as to provide for remote operation of the manifold assembly 110.

Figure 6:
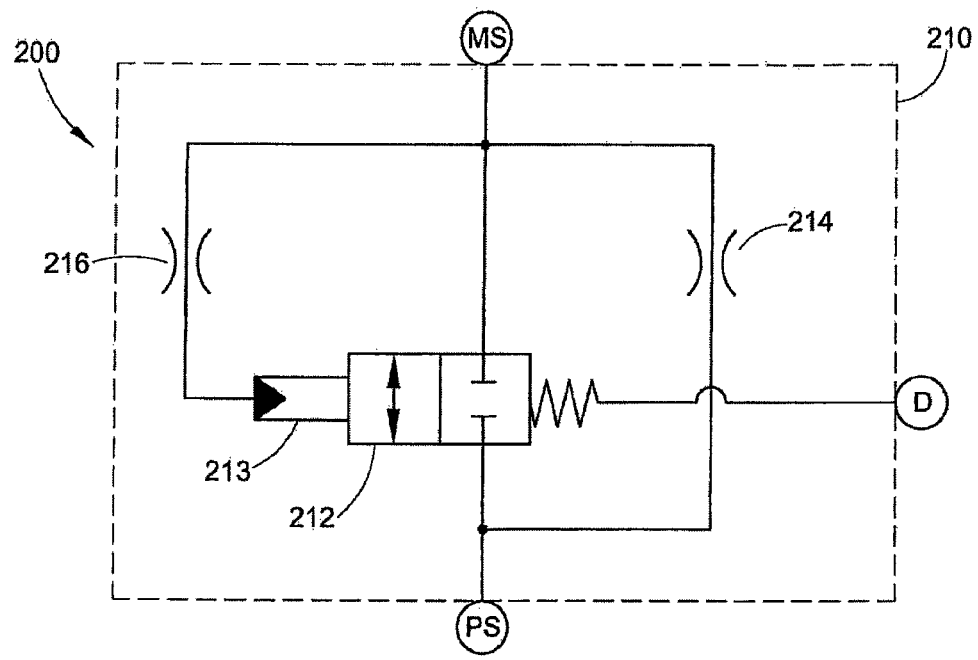
FIG. 6 is a hydraulic schematic of a second embodiment of a hydraulic soft start device, according to the present disclosure.
Figure 7:
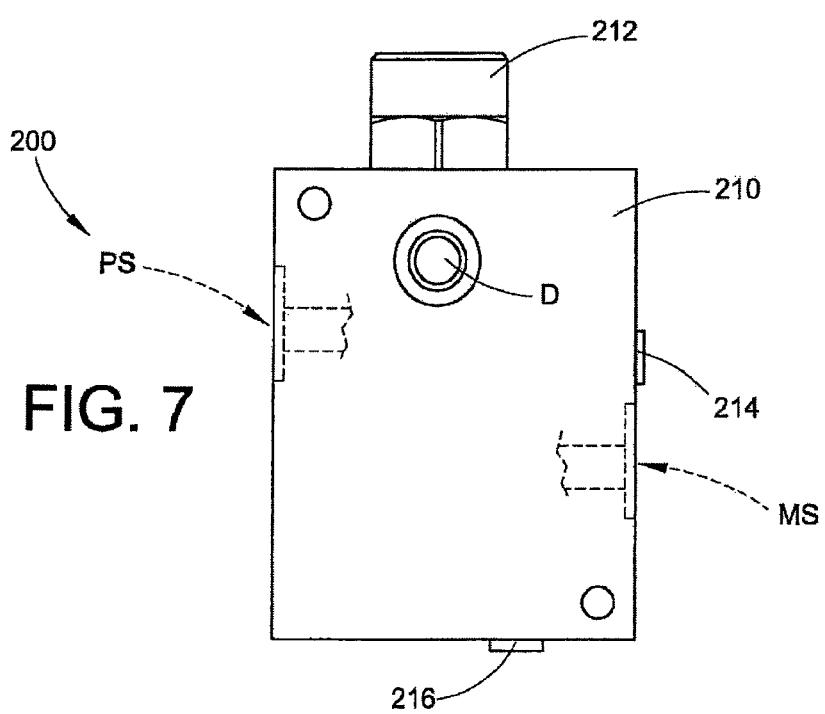
FIG. 7 is a front view of the second embodiment of the hydraulic soft start device according to FIG. 6.

Now with reference to FIGS. 6 and 7, a unitary hydraulic soft start valve assembly 200 is shown and may include a housing 210, a flow control valve 212 (which can be a piloted two-way spool valve), a first flow restricting orifice 214 and a second flow restricting orifice 216, as well as a pressure source port PS, a drain port D and a motor supply port MS. The flow control valve 212 of the unitary soft start valve assembly 200 operates in much the same way as discussed with respect to the second flow control valve 140 of the manifold assembly 110 in that it is also actuated by way of a hydraulic pilot 213. A pressurized hydraulic fluid can be supplied at pressure source port PS, at which point, a first fluid flow is allowed to pass through the first restricting orifice 214 into the motor supply port MS (and placing the attached motor in a first partially actuated or low power state). Simultaneously, a portion of the first fluid flow passing through the first orifice 214 will eventually pass through the second restricting orifice 216 to the pilot or pilot chamber 213 of the flow control valve 212. As before, once the backpressure at the motor supply port reaches an adequate threshold (e.g., after indexing and full engagement or coupling of the motor to the associated load) so as to cause the flow through the second orifice 216 to act upon the pilot, the flow control valve 212 will then shift to an open position. Once the flow control valve 212 shifts to the open position, a second fluid flow (which is higher than the first fluid flow in terms of one or both of pressure and/or volumetric flow rate) is allowed to pass from the pressure source port PS to the hydraulic motor supply port MS, thereby placing the associated motor in a second fully actuated high power state subsequent to the initial first partially actuated low power state. As before, this allows the motor to fully index, engage, and/or begin to drive the associated load or other transmission components. As is evident from the above disclosure, this is necessary to prepare the system for full power application (and to avoid any possibility of mal-alignment of transmission components and/or to avoid or lessen the inertial shock to the load, motor, etc.). In the meantime, such "soft starting" is accomplished with greater efficiency and a minimal loss of fluid pressure or flow by comparison to the "throttled" prior art approach.

It should also be noted, that as before, the first flow restricting orifice 214 can be of a larger diameter than the second flow restricting orifice 216 such that a proportionally lower fluid flow passes through the second restricting orifice as opposed to the first restricting orifice. It should further be noted, with regard to either of the above described embodiments, that the first flow restricting orifice may include an orifice sized diameter of approximately 0.125 inches and the second flow restricting orifice may include an orifice diameter of approximately 0.020 inches. The first flow restriction orifice will thus allow a proportionally greater fluid flow (i.e., a higher volumetric flow rate and a lower pressure drop) through the first orifice as compared to the second orifice.

Figure 8:
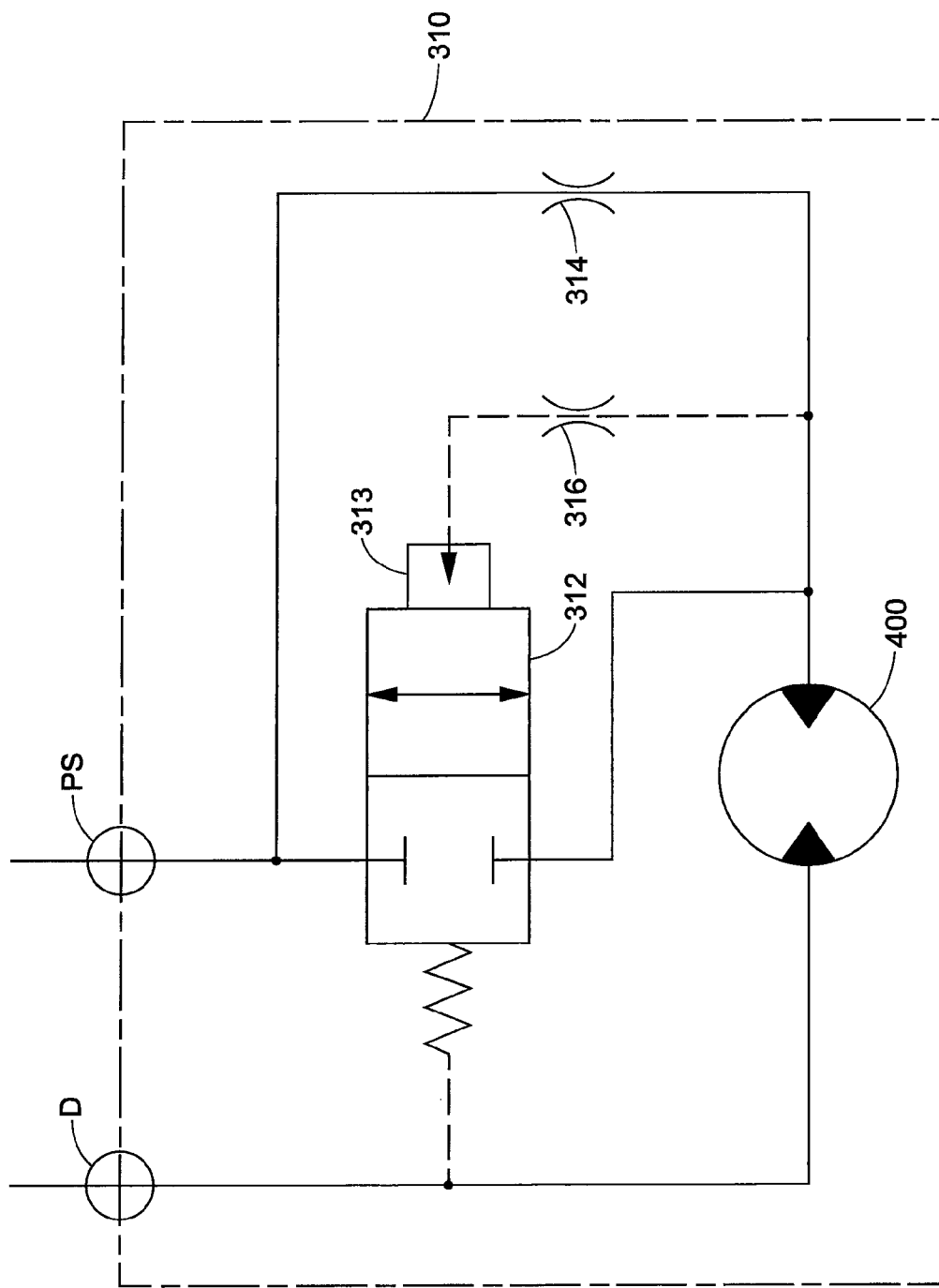
FIG. 8 is a hydraulic schematic of a third embodiment of a hydraulic soft start system, according to the present disclosure.
Figure 9:
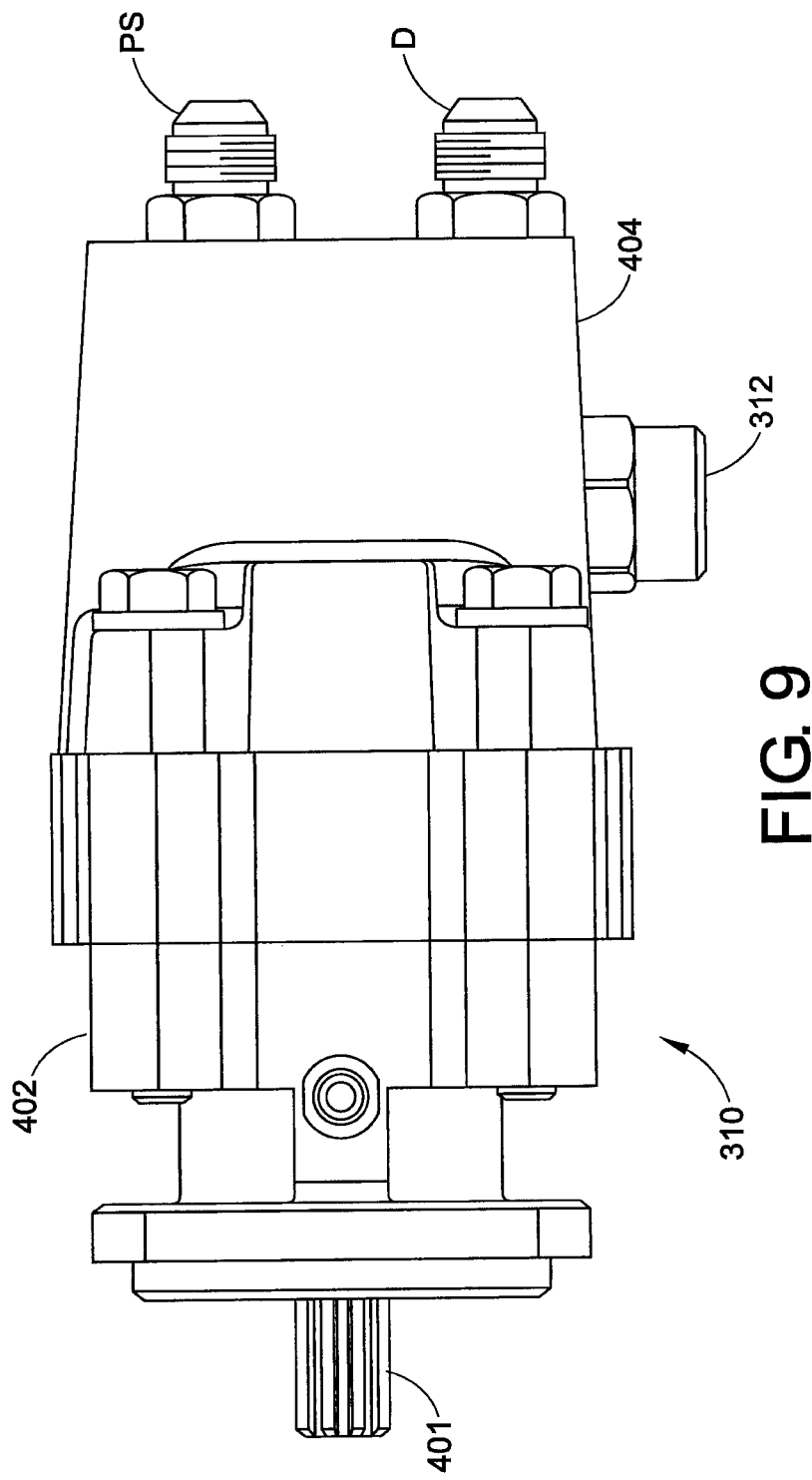
FIG. 9 is a side elevational view of the hydraulic soft start system of FIG. 8.

Now with reference to FIGS. 8 and 9, a unitary hydraulic soft start system can be integrated with a hydraulic motor. Such a system can include a housing 310, which accommodates a flow control valve 312 (which can be a piloted two-way spool valve), a first flow restricting orifice 314 and a second flow restricting orifice 316, as well as a pressure source port PS, a drain port D and a hydraulic motor 400. The first flow restricting orifice 314 can have a larger diameter than the second flow restricting orifice 316. In one embodiment, the first flow restricting orifice has a diameter of 0.125 inches whereas the second flow restricting orifice has a diameter of 0.020 inches. Thus, hydraulic fluid flows more readily through the first orifice 314 than through the second orifice 316. However, once the hydraulic fluid starts to rotate the motor 400, the pressure of the fluid increases and eventually fluid will flow through the second orifice 316. The pressurized hydraulic fluid then urges movement of the flow control valve 312 via the hydraulic pilot 313 against the bias of the spring. Now, the valve will open and hydraulic fluid at full pressure can then flow to the motor 400.

The housing 310, flow control valve 312, first flow restricting orifice 314, second flow restricting orifice 316, pressure source port PS and drain port D are all integrated and can be located within a port end cover 404 of the housing 310. The motor 400 can be a geared hydraulic motor located in a forward housing section 402 from which protrudes an output shaft 401 of the motor 400. The flow control valve 312 of the unitary soft start system operates in much the same way as discussed with respect to the second flow control valve 140 of the manifold assembly 110 in that it is also actuated by way of the hydraulic pilot 313.

A pressurized hydraulic fluid can be supplied at pressure source port PS (from a pump), at which point, hydraulic fluid at a first pressure is allowed to pass through the first restricting orifice 314 into the motor 400 which then begins to turn in a first partially actuated or low power state. A portion of the hydraulic fluid passing through the first orifice 314 will eventually pass through the second restricting orifice 316 to the pilot or pilot chamber 313 of the flow control valve 312. As before, once the backpressure at the motor supply port reaches an adequate threshold (e.g., after indexing and full engagement or coupling of the motor to the associated load) so as to cause the flow through the second orifice 316 to act upon the pilot, the flow control valve 312 will then shift to an open position. Once the flow control valve 312 shifts to the open position, the hydraulic fluid (which is now greater in terms of one or both of pressure and/or volumetric flow rate) is allowed to pass from the pressure source port PS to the hydraulic motor 400, thereby placing the hydraulic motor (which may be a gear hydraulic motor) in a second fully actuated high power state subsequent to the initial first partially actuated low power state. As before, this allows the motor to fully index, engage, and/or begin to drive the associated load or other transmission components.

As is evident from the above disclosure, it is necessary to prepare the system for full power application (and to avoid any possibility of mal-alignment of transmission components and/or to avoid or lessen the inertial shock to the load, motor, etc.). In the meantime, such "soft starting" is accomplished with greater efficiency and a minimal loss of fluid pressure or flow by comparison to the "throttled" prior art approach.

It should also be noted, that as before, the first flow restricting orifice 314 can be of a larger diameter than the second flow restricting orifice 316 such that a proportionally lower fluid flow passes through the second restricting orifice as opposed to the first restricting orifice. As shown in FIG. 8, the first flow restricting orifice 314 may include an orifice diameter of approximately 0.125 inches and the second flow restricting orifice 316 may include an orifice diameter of approximately 0.020 inches. Thus, the first flow restriction orifice will thus allow a proportionally greater fluid flow (i.e., a higher volumetric flow rate and a lower pressure drop) through the first orifice as compared to the second orifice.

The above disclosed hydraulic soft start system has potential applications for any hydraulic starter system where shock loads can be several times as severe as with electric starters used in the same applications. In addition, the instant manifold assembly or system could also be used for other hydraulic applications which require the slow activation while loading or meshing of components is completed prior to full pressurization of equipment.

In particular, the above disclosed soft start system or manifold assembly can include the following features: 1) system pressure regulation with bypass or unloading capabilities for a hydraulic pressure supply source; 2) over-pressure protection for the entire system; 3) pressure monitoring capabilities; 4) manifold assembly is remote start ready; 5) SAE ports (which provide good reliable connections) can be used for all connections to the manifold assembly or "smart block" including the system pressure gauge; 6) an adjustable control of slow start parameters including: (a) time delay between slow start (reduced pressure and flow to the starter) initiation and full start (full pressure and flow to the starter) initiation—controlled by the size of the second flow restricting orifice and (b) pressure and flow characteristics of the slow start phase delivered to the motor—controlled by the size of the first flow control orifice; and 7) an automatic shutoff feature tied to the starting of an engine through the electrical and/or hydraulic control of the first and/or second flow control valves.

The above disclosure provides for a number of advantages over the prior art soft start systems. These include: 1) the ability to have an "all-in-one", "unitary", or "integrated" valve assembly for controlling the parameters associated with a hydraulic system in one location (which affords a significant advantage over prior art systems requiring multiple discrete components to be added to the system). Also, having an integrated valve assembly results in fewer fluid connections and other associated potential leak sources; 2) the use of SAE fittings on all connections (instead of NPT connections which require tape or sealant, etc.) also makes the fluid connections less susceptible to leaks caused by vibration over time and the system less susceptible to contamination from tape or sealant (as typically used on NPT fittings); 3) a two level or two stage application of pressurized hydraulic fluid allows for faster cranking speeds by applying full system pressure sooner and faster as compared to the "throttled" prior art approach. Cranking speed and hydraulic fluid conservation are of a major concern especially when the available volume of pressurized hydraulic fluid is limited (i.e., to replenish pressurized hydraulic fluid without the engine running typically requires the use of a manual hand pump—a slow and laborious operation that is preferably avoided); 4) the use of fast acting poppet valves assures quick transition to full flow and pressure as well as an immediate stoppage of flow when the "start" or driving cycle is complete; 5) temperature variations are less likely to affect valve operation of the present disclosure due to the use of the two-stage/fluid flow approach (i.e., by comparison, a throttle valve approach will generate more heat and be more affected by varying fluid viscosity); 6) the modular valve design of the instant disclosure (by the use of cartridge style valves) allows for easy servicing, disassembly, inspection of the manifold assembly and replacement of valves when necessary; 7) the integrated valve/manifold assembly or "smart block" valve layout places all of the adjustable components (e.g., the unloading valve, pressure sensing valve, relief valve, pressure gauge, etc.) in one location or side of the housing or block for ease of access and setup; 8) changing the timing of the first initial, lower or reduced flow delivered to the motor can be done by simply changing or swapping out different orifice sizes. Moreover, the orifices can be easily accessed under SAE port plugs in the manifold or valve housing.

This disclosure has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A unitary hydraulic soft start system for use in starting a hydraulic motor, the system comprising:
   a housing;
   a pressure source port defined in the housing for receiving pressurized hydraulic fluid from an associated hydraulic pressure source;
   a hydraulic motor located in the housing to which the hydraulic pressure source supplies fluid to start the hydraulic motor;
   a drain port defined in the housing and positioned in a downstream location from said hydraulic motor;
   a pilot operated flow control valve located in the housing and including a pilot, an inlet, and an outlet, the inlet being in fluid communication with the pressure source port and the outlet being in fluid communication with the hydraulic motor;
   a first flow restricting orifice located in the housing in fluid communication with and disposed between the pressure source port and the hydraulic motor;

a second flow restricting orifice located in the housing in fluid communication with and disposed between the pilot and the hydraulic motor; and wherein when pressurized hydraulic fluid is supplied to the pressure source port, a first fluid flow is passed from the pressure source port via the first orifice to the hydraulic motor placing the hydraulic motor in a first partially-actuated low power state, a portion of the first fluid flow being passed via the second orifice to the pilot placing the valve in an open state after an actuation pressure is reached and allowing a second fluid flow to pass from the pressure source port to the hydraulic motor, the second fluid flow being higher than the first fluid flow, thereby placing the hydraulic motor in a second fully-actuated high power state subsequent to the first partially-actuated low power state.

2. The valve body of claim 1, wherein a diameter of said second flow restricting orifice is smaller than a diameter of said first flow restricting orifice.

3. The valve body of claim 1, wherein said second flow restricting orifice has a diameter of about 0.020 inches and said first flow restricting orifice has a diameter of about 0.125 inches.

4. The valve body of claim 1, wherein the flow control valve includes a spring for biasing the flow control valve into an end position.

5. The system of claim 1, wherein the associated hydraulic pressure source comprises an accumulator.

6. The system of claim 5, further including a charging circuit for pressurizing the accumulator.

7. The system of claim 6, wherein the charging circuit includes a hydraulic pump and a relief valve, the pump including an outlet that is in fluid communication with the accumulator and the relief valve.

8. The system of claim 7, wherein the charging circuit further includes a pressure sensing valve and an unloading valve, each of the pressure sensing valve and the unloading valve including an inlet, an outlet, and a pilot, the inlet of the sensing valve being in fluid communication with the pilot of the unloading valve, the outlet of the sensing valve and the outlet of the unloading valve being in fluid communication with a hydraulic reservoir, and the inlet of the unloading valve being in fluid communication with the outlet of the hydraulic pump.

9. A method for soft starting a hydraulic motor, the method comprising:

providing a hydraulic pressure source for supplying a pressurized hydraulic fluid;

providing a first flow restricting orifice including an inlet and an outlet, the inlet being in communication with the pressure source;

providing a second flow restricting orifice including an inlet and an outlet, the inlet being in fluid communication with the outlet of the first flow restricting orifice;

providing a hydraulic motor including an inlet communication with the outlet of the first flow restricting orifice and an outlet in fluid communication with a drain port;

providing a piloted flow control valve including an inlet in fluid communication with the pressure source and an outlet in fluid communication with the hydraulic motor, wherein the pilot is in fluid communication with the outlet of the second flow restricting orifice;

allowing the fluid from the pressure source to flow through the first flow restricting orifice and to the inlet of the hydraulic motor at a reduced flow rate, the motor thereby being placed in a partially-powered first state;

allowing a portion of the fluid flowing through the first orifice to flow through the inlet of the second flow restricting orifice, the outlet of the second orifice being in fluid communication with a pilot of the flow control valve;

actuating the flow control valve when the fluid pressure at the pilot reaches a valve actuating pressure; and allowing fluid to flow through the flow control valve to the hydraulic motor at an increased flow rate when the flow control valve is actuated, the motor thereby being placed in a fully-powered second state.

10. The method of claim 9, further including charging an accumulator which functions as the pressure source prior to actuating the flow control valve.

11. The method of claim 9, further comprising providing a housing which accommodates the first and second flow restricting orifices, the flow control valve and the hydraulic motor.

12. The method of claim 9 further comprising biasing the flow control valve to an end position before it is actuated.

* * * * *